United States Patent
Georges et al.

(10) Patent No.: US 9,266,264 B2
(45) Date of Patent: Feb. 23, 2016

(54) METHOD FOR MAKING GROUND COATINGS

(75) Inventors: Jean-Philippe Georges, Fauvillers (BE); Richard Peres, Bastogne (BE)

(73) Assignee: TARKETT SAS (FR)

( * ) Notice: Subject to any disclaimer, the term of this patent is extended or adjusted under 35 U.S.C. 154(b) by 449 days.

(21) Appl. No.: 12/679,756

(22) PCT Filed: Sep. 22, 2008

(86) PCT No.: PCT/EP2008/062643
§ 371 (c)(1),
(2), (4) Date: Mar. 24, 2010

(87) PCT Pub. No.: WO2009/040332
PCT Pub. Date: Apr. 2, 2009

(65) Prior Publication Data
US 2010/0201025 A1  Aug. 12, 2010

(30) Foreign Application Priority Data
Sep. 27, 2007  (EP) ..................................... 07301404

(51) Int. Cl.
| | | |
|---|---|---|
| *B29C 43/30* | (2006.01) | |
| *B29D 99/00* | (2010.01) | |
| *D06N 3/06* | (2006.01) | |
| *D06N 3/08* | (2006.01) | |
| *D06N 7/00* | (2006.01) | |
| *B29K 27/06* | (2006.01) | |
| *B29L 31/30* | (2006.01) | |

(52) U.S. Cl.
CPC ............ *B29C 43/30* (2013.01); *B29D 99/0057* (2013.01); *D06N 3/06* (2013.01); *D06N 3/08* (2013.01); *D06N 7/0028* (2013.01); *D06N 7/0055* (2013.01); *B29K 2027/06* (2013.01); *B29L 2031/3017* (2013.01)

(58) Field of Classification Search
USPC .......... 425/371, 373, 115, 335, 363; 264/131, 264/172.19, 213, 216
See application file for complete search history.

(56) References Cited

U.S. PATENT DOCUMENTS

| | | | |
|---|---|---|---|
| 4,794,020 A | | 12/1988 | Lussi |
| 5,571,588 A | * | 11/1996 | Lussi et al. ...................... 428/46 |
| 6,217,700 B1 | * | 4/2001 | Knobel ......................... 156/296 |
| 2004/0102120 A1 | | 5/2004 | Plusquellec et al. .......... 442/370 |
| 2004/0161588 A1 | * | 8/2004 | Mauk et al. ................... 428/143 |
| 2008/0053335 A1 | * | 3/2008 | Gustafsson et al. .......... 106/241 |

FOREIGN PATENT DOCUMENTS

| | | |
|---|---|---|
| EP | 1045751 B1 | 10/2000 |
| EP | 1838510 B1 | 10/2005 |
| FR | 2617875 A * | 1/1989 |
| GB | 1569943 | 6/1980 |
| WO | 9527007 A1 | 10/1995 |
| WO | WO 2006/005752 * | 1/2006 |

OTHER PUBLICATIONS

International Search Report PCT/EP2008/062643; Dated Jan. 23, 2009.

* cited by examiner

*Primary Examiner* — Ryan Ochylski
(74) *Attorney, Agent, or Firm* — Cantor Colburn LLP

(57) ABSTRACT

The invention relates to a method for making a ground coating made of a thermoplastic material, that comprises the steps of (a) depositing a layer of a liquid component on a substrate, the liquid component being selected from a plastisol, an organosol or an SBR rubber emulsion, (b) powdering solid particles on the liquid component layer, and (c) applying press heat in order to form a ground coating having a smooth surface. The invention also relates to a device for obtaining such coatings.

5 Claims, No Drawings

METHOD FOR MAKING GROUND COATINGS

TECHNICAL FIELD

The invention relates to the production of a floor covering from polymer particles (flakes, vermicelli, grains, etc.) which may cover a very wide range of appearances, including a homogeneous product appearance that has a perfectly smooth and uniform surface.

BACKGROUND

In the field of floor coverings, resilient products, usually based on PVC, enjoy great success, in a large part due to the variety of decorative possibilities that they permit. Indeed it is possible to print them, to produce chemical or mechanical embossing optionally in connection with printed designs, to produce material effects by combining various types of particles, resulting in graining, imitations of stones or other mineral or more generally natural effects.

Regarding these material appearances which increasingly appeal to the public and to which the invention relates, two techniques coexist.

The first, which results in the formation of the family of products known as "homogeneous products" comprises the following steps:
1 Extruding a certain number of films having different colors or mattness from a thermoplastic material, generally PVC
2 Mechanically granulating these films in order to obtain particles having more or less spherical shapes of the order of 5 mm in diameter (function of the final thickness of the product)
3 Mechanically mixing these particles as a function of the appearance desired for the finished product and distributing them on a conveyor using a Villars® type dispenser. In general, a deposition of a single layer of particles is aimed for, that is to say that particles are all in contact with the conveyor and only overlap very little. Since standard dispensers do not permit a deposition that is that uniform, in order to achieve this objective the conveyor may be subjected to vibrations, as the particles are free, the "overflow" may be discharged via the edges of the conveyor.
4 Introducing this assembly of particles into a Hymmen® type double-belt press. These machines act as a calender but make it possible to keep the particles at the desired softening point of the thermoplastic material for several seconds by gradually compressing it. They therefore avoid deforming the particles too much and creating (directional) line effects in the finished product. During the softening under high pressure (up to 40 bar) the particles based on the same thermoplastic material agglomerate with one another, their peaks are crushed so that the product formed has the appearance of a continuous film with perfectly smooth surfaces.

Each particle, with its color or mattness characteristics, nevertheless remains visible as is, although deformed, which gives the product its specific appearance.

This product is constituted of a single homogeneous layer of materials (homogeneous since being of the same chemical nature), hence its name.

When this material is subjected to traffic as a floor covering, its wear will not give rise to a variation in appearance since the product is, by construction, also homogeneous in its thickness (a single layer of particles deposited on the conveyor).

These products do not therefore intrinsically need additional protection with respect to the traffic linked to their use, that is to say, as for products based on plastisol (see below), a wear layer (or smoothing layer) generally deposited in liquid form at the end of the production process, then gelled in an oven.

These products make up a family that is highly valued for its strength qualities.

The particles may have a wide range of colors or mattness. Different esthetic effects may be obtained by varying the diameter of the particles, or even by mixing particles of different diameters.

Sophisticated embodiments exist which consist in producing relatively coarse designs via a system of covers or drawers arranged below dispensers or in using particles of uncommon sizes or shapes, as is described in patent EP 1838510.

Nevertheless, it remains impossible, with this technique, to combine particles of different chemical natures and even less mineral or metallic particles, nor particles of non-spherical flake type since these particles will inevitably be deformed during the process. The esthetic range linked to this process is therefore greatly limited.

The second, which results in the formation of the family of products known as "heterogeneous" products is based on the use of plastisol (mixture of PVC, plasticizer and optionally filler) which is in a liquid form.

In order to form products known as "heterogeneous" products:
1 Using a doctor blade or rolls or any other suitable means, a first liquid layer of colored plastisol, opaque plastisol or transparent, and therefore unfilled, plastisol (whereas a normal plastisol is 50% filled with, in general, calcium carbonate) is deposited on a substrate which may be, for example, a calendered film reinforced with a web of glass fibers.
2 Particles are then sprinkled over this layer of plastisol using a dispenser, for example of Villars® type.
3 At this stage, the penetration of the particles into the plastisol is not controlled. The particles remain predominantly at the surface, thus creating a random relief.
4 Furthermore, it is impossible to obtain a single-layer type deposition (no vibration possible due to the viscosity of the plastisol) and if it is attempted to remove the excess particles via suction for example, they will inevitably be contaminated by the plastistol which will make them unable to be recycled and will create multiple pollution problems.
5 The product is then pre-gelled. This is to say that it passes under an infrared assembly or into an oven, which will enable a first curing of the plastisol, therefore setting the particles.
6 A new layer of transparent plastisol known as smoothing plastisol is then deposited, the role of which will be to seal the product, that is to say to fill in the voids between the particles or the surface irregularities that the dropping thereof has inevitably caused in the plastisol medium. This plastisol, which is unfilled or not filled very much, is therefore expensive. Furthermore, it is never strictly speaking perfectly transparent and will therefore cause a "milky" haze on top of the decoration produced by the particles.
7 This deposition is followed by a gelling in an oven which will ensure the definitive cohesion of the covering.

These two succinct descriptions therefore clearly make it possible to comprehend the advantages and drawbacks of each of these two families of products.

Homogeneous products do not require a transparent smoothing (or wear) layer but remain limited esthetically due to the restricted type of particles that can be used, (due, in particular, to their deformation), whilst heterogeneous products based on plastisol, although they can use particles of all shapes and natures by blending them with one another, require a large supply of "transparent" plastisol which is therefore expensive since it is lightly filled, which will furthermore blur the reading of the decoration, and also a wear layer based on PU, and therefore also expensive.

With this second technique, appearances close to homogeneous are also impossible to achieve due to the plastisol/dispenser combination which does not allow the deposition of a single layer.

The read quality of the decoration is poorer than in the case of homogeneous products due to the addition of the smoothing plastisol, the particles never strictly speaking being at the surface of the covering.

Finally, the current processes using plastisol require a large number of separate successive steps that it is necessary to control individually and which generally increase the production costs.

To date, these techniques have therefore remained complementary, each being confined to its esthetic and economic range.

BRIEF SUMMARY

The invention proposes a single technique that makes it possible to obtain a large number of esthetic appearances linked to the use of particles while also benefiting from a perfectly smooth surface finish, even without resorting to a supplementary wear layer.

The invention also provides a device that makes it possible to obtain such a novel floor covering, and also the covering itself.

The invention is essentially based on two observations that are surprising for a person skilled in the art.

First, the quality of surface finish characteristic of homogeneous products may be obtained with pressure levels well below the levels generally required during the formation of such products.

Specifically, it is advisable, at the moment when what is still only a bed of particles passes into the Hymmen® type double press machine, to distinguish between, on the one hand, the thermodynamic conditions necessary for the adhesion of the particles to one another and therefore the formation of the cohesive film and, on the other hand, the thermodynamic conditions necessary for obtaining a smooth surface.

As regards the adhesion conditions in the case of homogeneous products, a temperature generally of the order of 160° C. and a pressure of the order of 20 to 40 bar are required in order to deform and sufficiently press the particles against one another. Specifically, not being able to go up to the melting point, which would lead to a mixing of the colors and a total loss of the integrity of the particles, it is necessary to compensate via a very high pressure level.

It has been determined during laboratory tests using the same type of granules as in homogeneous products that the pressure necessary to obtain a surface that is smooth or at least uniform (since a light embossing of the surface may be desired in order to increase the mattness) and therefore conforming to the surface finish of the belt in contact with the product, was between 1 and 2.5 bar, i.e. well below the pressure for formation of the homogeneous product itself.

These first tests made it possible to obtain products having the appearance of homogeneous products, i.e. a perfectly smooth film, but of course without sufficient cohesion: the particles detached from one another during handling.

Since the two phenomena of formation, in the form of a film, of the product and its surface smoothing take place simultaneously in the same machine, it had been wrongly concluded therefrom that they required the same operating conditions.

The second surprising observation based on the present invention is that the known technique using plastisol may be adapted advantageously in order to obtain products that combine the advantages of this technique with those of a process for the manufacture of homogeneous products.

Specifically, as indicated above, to date, these two techniques were completely separate and it is generally accepted that they were hardly able to converge due to fundamental differences at the heart thereof.

During research which led to the present invention, the inventors observed that by keeping the first step of the heterogeneous process using plastisol, namely the distribution of particles over a liquid plastisol layer and by carrying out a gelling or at least a pregelling, it is possible to obtain an advantageous result by using a low pressure of around 2 bar. Indeed, this pressure level proves sufficient to guarantee an excellent surface finish whereas a temperature around 180° C. will allow the pregelling of the plastisol and therefore a perfect adhesion of the particles within the plastisol and the cohesion of the product itself. A definitive gelling may be in fine obtained by conventional means, such as by gelling rolls or ovens (infrared or gas ovens, for example).

In conclusion, the present invention makes it possible to obtain a thermoplastic floor covering which, in its simplest form, is a homogeneous type covering with the advantages that are associated therewith, mainly a greater wear resistance in the sense that the appearance does not degrade during use, even without a supplementary wear layer, and also a simpler and more economical method of manufacture. Indeed, in a floor covering obtained with the process of the present invention, the particles are side by side as in the case of a homogeneous type covering.

Moreover, the invention also makes it possible to benefit from the advantages specific to plastisol coverings by offering a greater variability as regards the appearance, and also the production of floor coverings of heavier quality, possessing, where appropriate, a textile sublayer, etc.

One particular additional advantage of the present invention is that the device or the machine that enables this pregelling at low pressure may comprise two heat-resistant, preferably Teflon-coated conveyor belts, having variable lengths depending on the pregelling time, as a function of the amount of plastisol deposited and the desired production rates.

In such a machine, said particles of materials are deposited directly onto a layer of plastisol on a heat-resistant conveyor belt or on a support material placed on the latter. This layer then successively passes through a preheating section, heating section and cooling section of a treatment zone of an installation designed to carry out said process. The device preferably enables a guidance system of the upper conveyor belt to be adjusted and secured in a vertical direction.

Mention may be made, as a machine which may be suitable, with certain adaptations, for the present process of the machine sold under the trademark Thermofix® by the German company Schilling-Knobel GmbH, in particular those described in U.S. Pat. No. 6,217,700 or in patent EP 1 045 751.

Indeed, to date, these machines were designed and used in the industrial context solely for the use of "dry blend" type powder, but they could fulfill the required conditions (double belts, pressure levels) with certain adaptations appropriate for liquid resins, such as plastisol (doctor blade, roll, suitable gum, etc.).

But of course other machines that intrinsically permit a higher pressure level may be used, such as the AUMA® type machines constituted of a heating roll and of a belt that adopts around a half circumference of the roll or the Hymmen® type machines described previously.

DETAILED DESCRIPTION

The present invention therefore proposes a process for manufacturing a novel thermoplastic floor covering comprising the following steps:
 (a) depositing a layer of a liquid component onto a support;
 (b) sprinkling solid particles onto the layer of liquid component; and
 (c) applying pressure and heat in order to form a floor covering that has a smooth surface.

The step of applying pressure and heat (c) is preferably carried out between two, lower and upper, conveyor belts, more preferably in a double-belt press. The pressure exerted on the floor covering is preferably low and generally lies between 0.05 and 8 bar, preferably between 0.1 and 5 bar and particularly preferably between 0.15 and 3 bar.

In general, the layer of liquid component has a thickness between 0.5 mm and 3 mm.

The liquid component is chosen, within the context of the present invention, from a plastisol, an organosol or an emulsion of SBR rubber.

Preferably plastisol is used. The plastisols that can be used are generally those known to a person skilled in the art, that are optionally transparent or translucent, and compatible with the particles used, for example mixtures based on PVC and plasticizers.

The component may also be an organosol (mixture based on plasticizer(s) and compatible polymers) which more generally may be suitable for the invention, such as for example the organosols based on PMMA (polymethyl methacrylic acid) or acrylic.

Certain polymers in the form of emulsion may also be suitable, such as SBRs (styrene butadiene rubbers): reference will then be made to crosslinking rather than gelling.

Within the present document, the term "plastisol" may therefore as a variant be replaced by the terms "organosol" or "SBR emulsion" and the present invention therefore also relates to these variants. As suggested below, in the case of SBR emulsions, the term "to gel" and also the related terms should be read as having the meaning of "to crosslink".

The granules or solid particles that can be used within the context of the present invention are particulate materials comprising thermoplastic materials for example, but not exclusively, polyvinyl chloride (PVC), polyolefilns, polyamides or mixtures thereof, but also particles of mineral or metallic origin. The granules used for the manufacture of a floor covering may be of different nature and/or appearance as long as they are compatible with the plastisol used.

The amount of particles used may vary from 0 to 60% by weight of the plastisol layer+granules, preferably from 1 to 20% by weight as a function of the appearance and of the other desired properties. The ratio of particles to plastisol is chosen so that the particles, after the processes, are well coated by the gelled plastisol so as to be able to obtain a cohesive surface.

The size of the particles obviously depends on the thickness of the desired floor covering and consequently on the thickness of plastisol applied. Generally, the largest dimension of the granules does not exceed (significantly) that anticipated for the final covering. Their shape is not, on the other hand, crucial, but makes it possible to vary, further still, the possible decorations.

The deposition of plastisol may be carried out directly on the lower conveyor belt or onto a support placed on the latter. This support may be removable in order to be detached from the floor covering at the end of the process or subsequently, for example a "release" type paper or any other equivalent means known to a person skilled in the art.

The support may also be an integral part of the finished floor covering if so desired. In this case, it will be referred to as a sublayer which is chosen, for example, from a calendered sublayer, a textile, a nonwoven fabric, etc., especially made of glass fibers, polyester, natural fibers, etc.

The process according to the invention advantageously comprises a pregelling step between the step (b) of sprinkling particles onto the layer of liquid plastisol and the step (c) of applying pressure and heat.

The time necessary for the various steps of the process depends on the nature and on the amount of plastisol and particles deposited, but also on the temperature and the pressure used. As the pressure is relatively low and as the gelling temperature should not exceed a certain threshold in order not to completely melt the granules, it is possible to adapt the speed of the conveyor belts and/or their length as a function of the other parameters.

Another aspect of the invention relates to a device, in particular, for carrying out the process for manufacturing a thermoplastic floor covering as described above, comprising (a) a lower conveyor belt, (b) an upper conveyor belt placed above a portion of the lower conveyor belt (a) and at a distance from the latter which corresponds to the thickness of the floor covering and that makes it possible to exert a pressure on this floor covering, (c) a heating zone followed by (d) a cooling zone, and also upstream of the heating zone (c), (e) a plastisol applicator, followed by (f) a particulate material applicator above the lower conveyor belt (a).

The distance between the two conveyor belts (a) and (b) can preferably be adjusted as a function of the thickness of the chosen floor covering. The upper conveyor belt (b) may be designed in a floating manner in order to control the pressure exerted on the floor covering.

The device optionally comprises a supplementary heating zone (g) (preheating or pregelling zone) before and/or after the particulate material applicator (f) enabling pregelling of the plastisol.

The plastisol applicator or distributor (e) may be of any known type and preferably comprises a doctor blade and/or one or more rolls. One particularly suitable plastisol applicator makes it possible to deposit a layer of plastisol having a thickness between 0.5 mm and 3 mm. In the case of the use of a support intended to be integrated into the covering, it may be advantageous to carry out the application of plastisol in more than one step, for example by means of a plastisol applicator (e) having two different application zones, separated for example by a supplementary heating zone, in order to pretreat the support. The plastisol applied in the first step, then pregelled then acts as a size for the support.

The applicator of particulate materials (f) may be in its simplest form a dispenser of granules, flakes, etc. of a single type or appearance, but it may generally be advantageous to be able to apply several types of granules of different appearance, size, nature and/or color, either as a mixture, or successively.

As already indicated above for the process according to the invention, the device may also comprise (h) a support applicator upstream of the plastisol applicator (a). The support may in this case be removable from the finished floor covering, for example a "release" type paper, or may be an integral part of the floor covering in the form of a firmly attached sublayer, preferably a calendered sublayer, a textile, a nonwoven fabric or a glass web.

A last aspect of the invention is a thermoplastic floor covering as described above. Advantageously, this is obtained by a process or by means of a device as described previously and comprises solid particles integrated into a gelled plastisol layer, the upper surface of which is essentially smooth.

As a function of the properties desired for the floor covering, it is also possible to apply it to a substrate, independently of the use of an integrated support, especially to a flexible substrate, for example a layer of foam, or to a rigid substrate, for example made of wood in pure, laminated or pressed form or in the form combined with plastics (composites) or made of a rigid plastic, for example of extruded polypropylene type, etc.

Finally, even when the floor coverings of the present invention do not a priori need a supplementary wear layer, it may be advantageous or desirable to apply such a supplementary layer, for example having a thickness of a few micrometers based on polyurethane, thereto, for example to further improve the protection against stains.

Other features and characteristics of the invention will emerge from the example below.

EXAMPLES

Example of a product (floor covering) structure
From bottom to top: 1 mm calendered sublayer of glass web-1 mm of plastisol to a total thickness of 2 mm.
Description of the structure: heterogeneous product with decoration in the bulk including an incorporation of particles at the surface without addition of transparent wear layer.
Procedure for the Structure
Unwinding of the calendered sublayer—coating of 1 mm of plastisol (for example opaque plastisol) onto the glass web (as a variant, it is possible to "seal" the glass web with a first deposition of 200 µm followed by a gelling pass, then by depositing an 800 µm layer by doctor blade or reverse roll)—distribution of the flakes—passing through an infrared (IR) oven or through a thermal oven—passing into a low-pressure double-belt press (for example of modified Thermofix® type)—optional embossing—optional deposition of a PU finishing layer.
Parameters of the low-pressure double-belt press
Heating zone: 3 m
Top/bottom zone temperature: 190° C.
Speed: 0.6 m/min
Pressure: 4 bar (but by comparison with the pressure of a double steel belt press the pressure is rather <1 bar)

| Plastisol formulation | |
|---|---|
| Lacovyl PB 1805 (PVC) | 1500.0 |
| Lacovyl PB 1202 (PVC) | 750.0 |
| Vinnolit C 66 W (PVC) | 750.0 |
| DIHP (plasticizer) | 975.0 |
| Viscosity reducer | 225.0 |
| Stabilizer | 75.0 |
| Epoxidized soybean oil | 60.0 |
| RC 82 (titanium) | 130.0 |

| Flake formulation | |
|---|---|
| Minex S 40 (transparent filler) | 270 |
| Stabilizer | 180 |
| DINP (plasticizer) | 1020 |
| Epoxidized soybean oil | 135 |
| Etinox 630 (PVC) | 4560 |
| Anti-static agent | 60 |
| Mic Red BRN - AQ (20%) (pigment) | 0.495 |
| Mic White 220 NQ - F (pigment) | 59.565 |
| Mic Blue 138 AQ (GLP - AQ) 20% (pigment) | 0.435 |
| Mic Black SRF - NQ F 30% (pigment) | 3.675 |

The floor covering obtained has a very smooth surface and high cohesion.

The invention claimed is:
1. A process for manufacturing a thermoplastic floor covering comprising the following steps:
   (a) depositing a layer of a liquid component onto a support, the liquid component comprising a plastisol, an organosol or an emulsion of SBR rubber;
   (b) sprinkling solid particles onto the layer of liquid component; and
   (c) applying pressure and heat between a lower conveyor belt and an upper conveyor belt to form a floor covering that has a smooth surface, the pressure being limited to between 0.1 and 5 bar; and
   (d) a pregelling step between the step (b) of sprinkling particles onto the layer of liquid component and the step (c) of applying pressure and heat.
2. The process as claimed in claim 1, in which the support is removable from the floor covering.
3. The process as claimed in claim 1, in which the support is part of the floor covering and comprises a calendered sublayer, a textile or a nonwoven fabric or glass web.
4. The process as claimed in claim 1, in which the layer of liquid component has a thickness between 0.5 mm and 3 mm.
5. The process as claimed in claim 1, in which the solid particles comprise plastic, inorganic or metallic materials or mixtures thereof.

* * * * *